(12) United States Patent
Takahashi et al.

(10) Patent No.: US 10,119,609 B2
(45) Date of Patent: Nov. 6, 2018

(54) SHAFT DRIVE TYPE VEHICLE

(71) Applicant: HONDA MOTOR CO., LTD., Tokyo (JP)

(72) Inventors: Yoshiki Takahashi, Tokyo (JP); Hiroyuki Makita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 423 days.

(21) Appl. No.: 15/070,443

(22) Filed: Mar. 15, 2016

(65) Prior Publication Data

US 2016/0281840 A1 Sep. 29, 2016

(30) Foreign Application Priority Data

Mar. 27, 2015 (JP) ................. 2015-066666

(51) Int. Cl.
| | |
|---|---|
| *F16H 57/04* | (2010.01) |
| *F16H 1/14* | (2006.01) |
| *F16H 1/00* | (2006.01) |
| *F16D 3/223* | (2011.01) |
| *F16H 57/038* | (2012.01) |
| *B62M 7/04* | (2006.01) |
| *B62M 17/00* | (2006.01) |
| *B62L 1/00* | (2006.01) |

(52) U.S. Cl.
CPC ........... *F16H 57/0495* (2013.01); *B62M 7/04* (2013.01); *B62M 17/00* (2013.01); *F16D 3/223* (2013.01); *F16H 1/006* (2013.01); *F16H 1/14* (2013.01); *F16H 57/038* (2013.01); *F16H 57/043* (2013.01); *F16H 57/0424* (2013.01); *F16H 57/0457* (2013.01); *B62L 1/005* (2013.01)

(58) Field of Classification Search
CPC .... F16H 57/04; F16H 57/0495; F16H 57/038; F16H 57/0457; B62M 17/00
See application file for complete search history.

(56) References Cited

U.S. PATENT DOCUMENTS

| | | | |
|---|---|---|---|
| 2009/0071753 A1* | 3/2009 | Carnelli | B64C 27/006 184/6.4 |
| 2013/0333506 A1* | 12/2013 | Newberry | B64C 27/14 74/467 |
| 2016/0033029 A1* | 2/2016 | Gerstenberger | F16H 57/037 475/160 |

(Continued)

FOREIGN PATENT DOCUMENTS

| | | |
|---|---|---|
| JP | S57109361 U | 7/1982 |
| JP | S60104390 U | 7/1985 |
| JP | 2008-074286 A | 4/2008 |

*Primary Examiner* — David M Fenstermacher
(74) *Attorney, Agent, or Firm* — Squire Patton Boggs (US) LLP (57) ABSTRACT

A final gear box accommodates a pinion gear and a bevel gear in a rotatable manner and contains an oil. A recess is provided at a downstream end of a drive shaft. The recess and the upstream end of the pinion gear shaft portion are splined coupled with each other so that the drive shaft and the pinion gear can be rotated together and relatively moved in an axial direction. A space permitting relative movement between the drive shaft and the pinion gear is provided between the pinion gear and the recess. The pinion gear is provided with a hollow portion which pierces the pinion gear in the axial direction and conducts oil to the space portion.

17 Claims, 6 Drawing Sheets

(56) References Cited

U.S. PATENT DOCUMENTS

2016/0281840 A1* 9/2016 Takahashi .......... F16H 57/0495
2017/0089449 A1* 3/2017 Olson ................. F16H 57/0431
2017/0343100 A1* 11/2017 Kawarazaki ........ F16C 33/6677

* cited by examiner

SHAFT DRIVE TYPE VEHICLE

BACKGROUND

1. Field

The present invention relates to a shaft drive type vehicle in which power of a power source is transmitted to an axle shaft through a drive shaft, a pinion gear, and a bevel gear.

2. Description of the Related Art

There is a shaft drive type vehicle in which power of an engine is transmitted to an axle shaft through a drive shaft, a pinion gear, and a bevel gear. In relation to this type of shaft drive vehicle, a configuration has been disclosed in which a pinion gear and a bevel gear are rotatably supported inside a final gear box, and these gears are lubricated with an oil contained in the final gear box (see, for example, Japanese Patent Laid-Open No. 2008-74286 (Patent Document 1)).

In Patent Document 1, a power transmission structure is described. In the power transmission structure, a third shaft portion is connected to a rear end portion of the drive shaft through a universal joint, and an outer cylinder portion is slidably connected to an outer circumferential surface of the third shaft portion through spline coupling. In addition, a third bevel gear is spline coupled to an inner circumferential surface of the outer cylinder portion, and the third bevel gear is meshed with an annular fourth bevel gear which converts a rotational axis by 90 degrees toward the direction of an axle. Further, a hub is fixed by press fitting to an inner circumferential portion of the fourth bevel gear. With such a structure, rotation of the drive shaft is transmitted to a driving wheel. In addition, Patent Document 1 describes a lubrication structure in which an oil hole piercing the outer cylinder portion in the radial direction is provided, and the location of splines present outside of the outer cylinder portion is lubricated through the function of the oil hole.

In the conventional configuration as above, however, the transmission structure between the drive shaft and the fourth bevel gear located on the most downstream side includes the third shaft portion, the outer cylinder portion splined coupled to the outer circumferential surface of the third shaft portion, and the third bevel gear spline coupled to the inner circumferential surface of the outer cylinder portion. Thus, the conventional configuration includes an increased number of component parts, which is disadvantageous for reduction in weight.

In addition, it is desired to supply a sufficient amount of an oil to the location of spline coupling, but mere provision of the oil hole in the outer cylinder portion may not be enough to achieve sufficient supply of the oil.

SUMMARY

The present invention has been made in consideration of the above-mentioned circumstances. Accordingly, it is an object of the present invention to provide a shaft drive type vehicle in which favorable lubrication of a location of spline coupling can be achieved while ensuring that a transmission structure between a drive shaft and a bevel gear located on the most downstream side is configured to be advantageous for reduction in weight.

In order to solve the above-mentioned problem, according to the present invention, there is provided a shaft drive type vehicle configured so that power of a power source is transmitted through a drive shaft to a pinion gear and transmitted to an axle shaft through a bevel gear meshing with the pinion gear. In the shaft drive type vehicle, a final gear box is provided which is adapted to accommodate the pinion gear and the bevel gear in a rotatable manner and to contain an oil for lubrication. In addition, a recess in which to dispose an upstream end of a pinion gear shaft portion constituting a shaft portion of the pinion gear is provided at a downstream end of the drive shaft. Besides, the recess and the upstream end of the pinion gear shaft portion are spline coupled to each other so that the drive shaft and the pinion gear can be rotated as one body and relatively moved in an axial direction. Further, a space portion permitting relative movement between the drive shaft and the pinion gear in the axial direction is provided between the pinion gear and the recess, with the pinion gear provided with a hollow portion which pierces the pinion gear in the axial direction and conducts the oil to the space portion.

In the above configuration, the recess may be provided with a female spline. The pinion gear may be provided with a male spline for engagement with the female spline, and the female spline and the male spline are spherical splines which are coupled with each other while permitting the drive shaft and the pinion gear to be tilted.

In addition, in the above configuration, the final gear box may include an opening communicating with the hollow portion, and an oil guide wall extending upward from the opening and receiving the oil raked up by rotation of the bevel gear.

In the above configuration, the opening may communicate with one end of the hollow portion and be larger than the hollow portion in aperture size.

The pinion gear may have a downstream end rotatably supported on the final gear box, on a side opposite to the upstream end of the pinion gear shaft portion, and the downstream end may be composed of a collar inserted in a recess provided in the pinion gear shaft portion.

A separated distance between a shaft portion of the bevel gear and the opening of the final gear box may be smaller than an inside diameter of the hollow portion of the pinion gear.

The pinion gear may be rotatably supported on the final gear box through a bearing including an inner race and an outer race. The inner race may be fixed by a lock nut fastened to the pinion gear shaft portion, and the outer race may be fixed by a lock nut fastened to the final gear box.

The shaft drive type vehicle may further include a brake disk provided on an inner side of the final gear box in a transverse direction, and an oil seal provided between the final gear box and the brake disk, and an annular drain groove provided on an outer side of the oil seal and extending along an outer circumference of the axle shaft.

In certain embodiments of the present invention, the final gear box is provided which accommodates the pinion gear and the bevel gear in a rotatable manner and contains the oil for lubrication. The drive shaft is provided at the downstream end thereof with the recess in which to dispose the upstream end of the pinion gear shaft portion constituting a shaft portion of the pinion gear. The recess and the upstream end of the pinion gear shaft portion are spline coupled to each other so that the drive shaft and the pinion gear can be rotated as one body and relatively moved in the axial direction. The space portion permitting axial movement between the drive shaft and the pinion gear is provided between the pinion gear and the recess. The pinion gear is provided with the hollow portion which penetrates the pinion gear in the axial direction and conducts the oil to the space portion. As a consequence, the drive shaft and the pinion gear, which is a gear meshing with the bevel gear located on the most downstream side, are directly spline coupled with each other. Accordingly, a simple structure having a reduced number of component parts can be realized, which is advantageous for reduction in weight.

In addition, since the hollow portion is provided which pierces the pinion gear in the axial direction and conducts the oil to the space portion permitting axial movement between the drive shaft and the pinion gear, the oil can be easily supplied to the location of spline coupling between the drive shaft and the pinion gear.

As a result of these points, the location of spline coupling can be favorably lubricated while adopting a configuration advantageous for reduction in weight of the transmission structure between the drive shaft and the pinion gear meshing with the bevel gear located on the most downstream side.

Where the recess is provided with the female spline, whereas the pinion gear is provided with the male spline for engagement with the female spline, and these splines are spherical splines for coupling the drive shaft and the pinion gear to each other while permitting tilting of them, the drive shaft and the pinion gear can be appropriately coupled to each other with a simple configuration.

Where the final gear box includes the opening communicating with the hollow portion and the oil guide wall which extends upward from the opening and receives the oil raked up by rotation of the bevel gear, the oil can be easily guided to the opening and can enter the hollow portion readily.

Where the opening communicates with one end of the hollow portion and is greater than the hollow portion in aperture size, the step is formed between the opening and the hollow portion, so that the step can function as an oil sump, and the oil can enter the hollow portion easily.

Where the pinion gear has the downstream end rotatably supported on the final gear box, on the side opposite to the upstream end of the pinion gear shaft portion, and the downstream end is composed of the collar inserted in the recess provided in the pinion gear shaft portion, the gear cutting of the pinion gear can be easily carried out by detaching the collar at the time of gear cutting, while adopting the configuration in which the downstream end of the pinion gear is rotatably supported. Consequently, manufacturing cost can be lowered easily.

Where the separated distance between the shaft portion of the bevel gear and the opening of the final gear box is set to be smaller than the inside diameter of the hollow portion of the pinion gear, the oil flowing on and along the final gear box can enter the opening easily.

Where the pinion gear is rotatably supported on the final gear box through the bearing which has the inner race and the outer race, and the inner race is fixed by the lock nut fastened to the pinion gear shaft portion whereas the outer race is fixed by the lock nut fastened to the final gear box, the bearing can be fixed easily.

Where the brake disk is provided on the inner side of the final gear box in the transverse direction, the oil seal is provided between the final gear box and the brake disk, and the annular drain groove is provided on the outer side of the oil seal and extends along the outer circumference of the axle shaft, the oil coming to the outside of the oil seal can be recovered into the annular drain groove, so that sticking of the oil to the brake disk or the like can be avoided.

DETAILED DESCRIPTION

Embodiments of the present invention will be described below, referring to the drawings. It is to be noted that in the following description, the directions such as the forward, rearward, leftward, rightward, upward, and downward directions are the same as those with respect to a vehicle body, unless specified otherwise. In addition, sign FR in each drawing indicates the front side of the vehicle body, sign UP indicates the upper side of the vehicle body, and sign LH indicates the left-hand side of the vehicle body.

Figure 1:
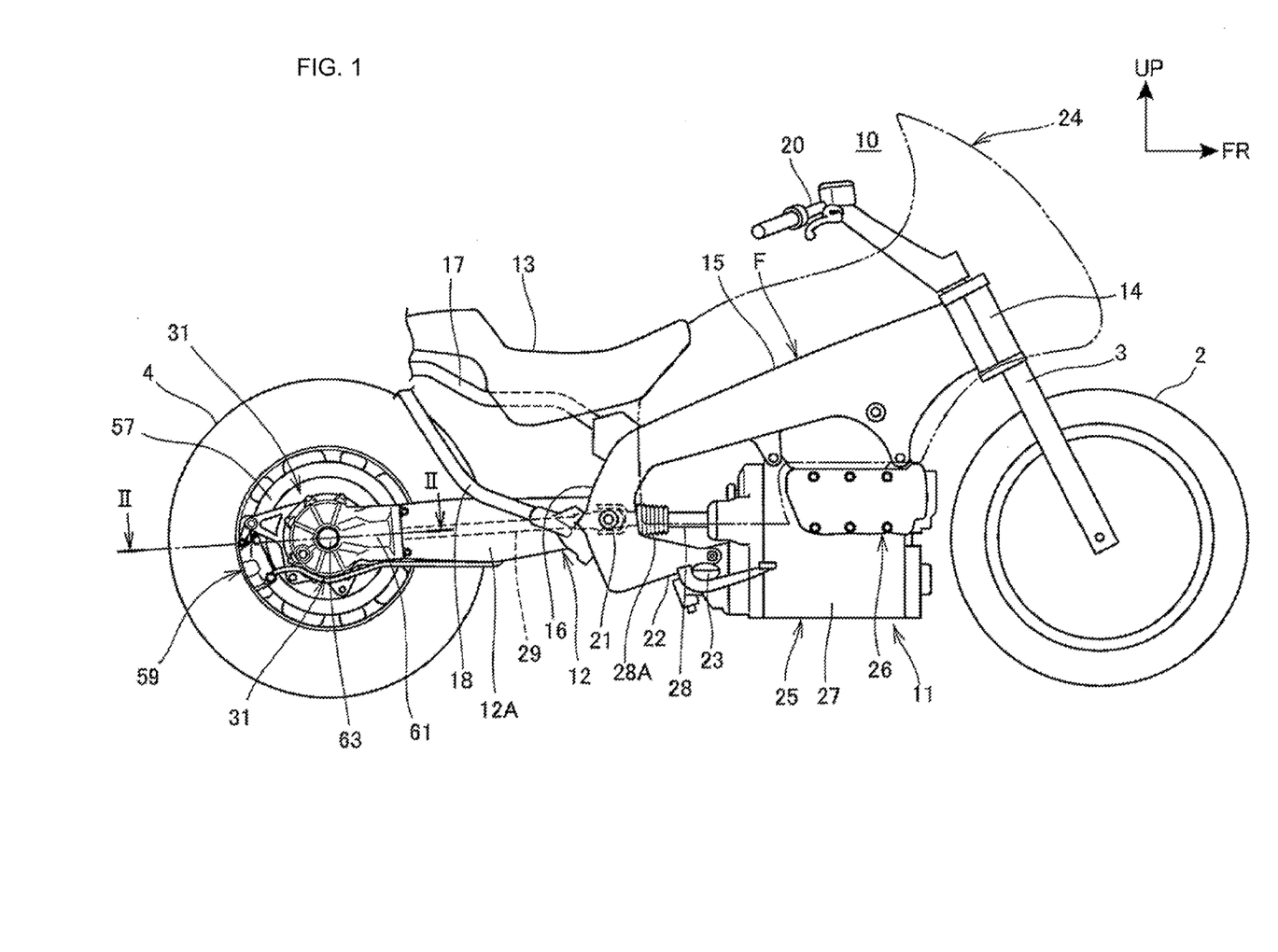
FIG. 1 illustrates a motorcycle according to an embodiment of the present invention.

FIG. 1 illustrates a vehicle according to an embodiment of the present invention.

In this example, motorcycle 10 is a saddle type vehicle wherein an engine 11 as a power source of the motorcycle 10 is supported on a lower portion of a body frame F, a front fork 3 supporting a front wheel 2 is supported on a front portion of the body frame F so as to be steerable to the left and right, a swing arm 12 for suspension of a rear wheel 4 is supported on a rear portion of the body frame F in a vertically swingable manner, and a rider seat 13 is supported on an upper portion of the body frame F.

The body frame F includes a head pipe 14 provided at a front end for rotatably supporting the front fork 3, a pair of left and right main frames 15 spreading in the transverse direction (vehicle width direction) from the head pipe 14 and then extending rearward while sloping down, and a pair of left and right center frames 16 extending downward from rear ends of the main frames 15. In addition, the body frame F includes a pair of left and right seat frames 17 extending from rear end sides of the main frames 15 to rear portions of the vehicle, and a pair of left and right sub frames 18 extending downwardly upward from lower portions of the center frames 16 and connected to rear portions of the seat frames 17.

A steering handlebar 20 is provided at an upper end of the front fork 3. The rider seat 13 is supported on the seat frames 17.

A front end of the swing arm 12 is pivotally supported on vertically intermediate portions of the left and right center frames 16 through a pivot shaft 21. The swing arm 12 is supported to be vertically swingable with reference to the pivot shaft 21.

The left and right center frames 16 include forward extension portions 22 extending forward from lower portions thereof. Left and right footrests 23 on which the feet of the rider seated on the rider seat 13 are to be put are supported on the forward extension portions 22. The motorcycle 10 can include a body cover 24 covering the body frame F and the like.

The engine 11 is disposed below the main frames 15 and forwardly of the center frames 16. The engine 11 is, in this example, a horizontal opposed internal combustion engine which includes a crankcase 25 constituting an engine lower portion, and a pair of cylinder portions 26 projecting substantially horizontally to left and right outer sides in the transverse direction from the crankcase 25.

The crankcase 25 has a transmission chamber 27 at a lower portion thereof. A transmission (not shown) for reducing an output of a crankshaft is accommodated in the transmission chamber 27. An output shaft 28 of the transmission extends rearward from a rear surface of the crankcase 25. The output shaft 28 is connected to a front end of a drive shaft 29 passed through the inside of the swing arm 12, and an output of the engine 11 is transmitted through the drive shaft 29 to the rear wheel 4.

In other words, the motorcycle 10 can be configured as a shaft drive type vehicle in which the power of the engine 11 is transmitted through the drive shaft 29 to the rear wheel 4. A connection portion between the output shaft 28 and the drive shaft 29 is covered with a cover 28A.

Figure 2:
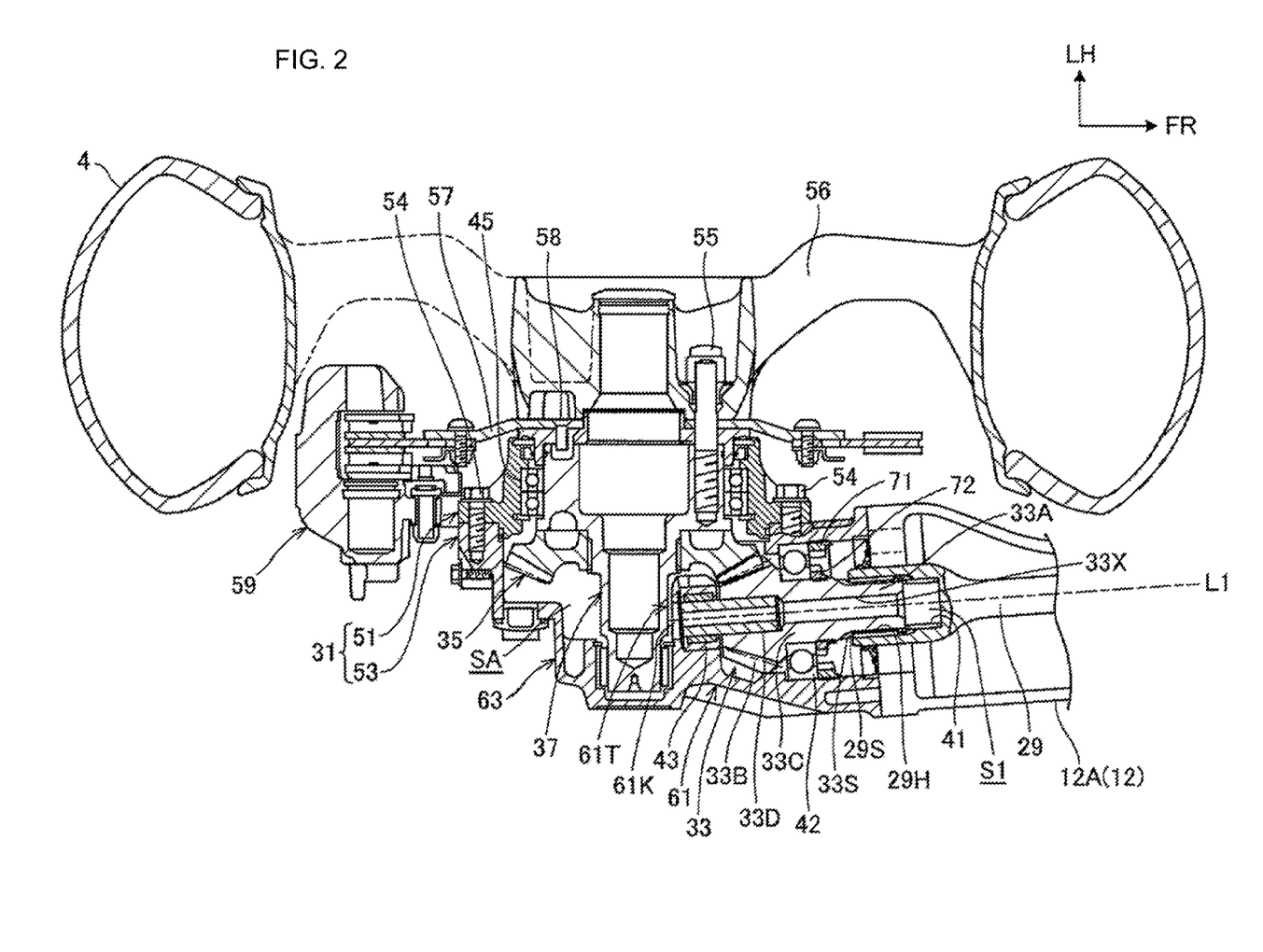
FIG. 2 is a sectional view taken along line II-II of FIG. 1.

FIG. 2 is a sectional view taken along line II-II of FIG. 1.

The swing arm 12 is a cantilever type swing arm which supports the rear wheel 4 in a cantilever fashion. The swing arm 12 includes a hollow arm portion 12A extending rearward on one side (in the present configuration, on the right side) of the rear wheel 4 in the transverse direction. A final gear box 31 is connected to a rear end of the arm portion 12A.

The drive shaft 29 is passed through the inside of the arm portion 12A, and an end portion of the drive shaft 29 extends to a rear end of the arm portion 12A. Rotation of the drive shaft 29 is transmitted to an axle shaft 37 of the rear wheel 4 through a pinion gear 33 and a bevel gear 35 disposed in the final gear box 31.

By the pinion gear 33 and the bevel gear 35, a final speed reduction ratio in transmission of the rotation of the drive shaft 29 to the rear wheel 4 is set. In other words, the final gear box 31 accommodates the pinion gear 33 and the bevel gear 35 therein and functions as a final gear device for setting the final speed reduction ratio.

Figure 3:
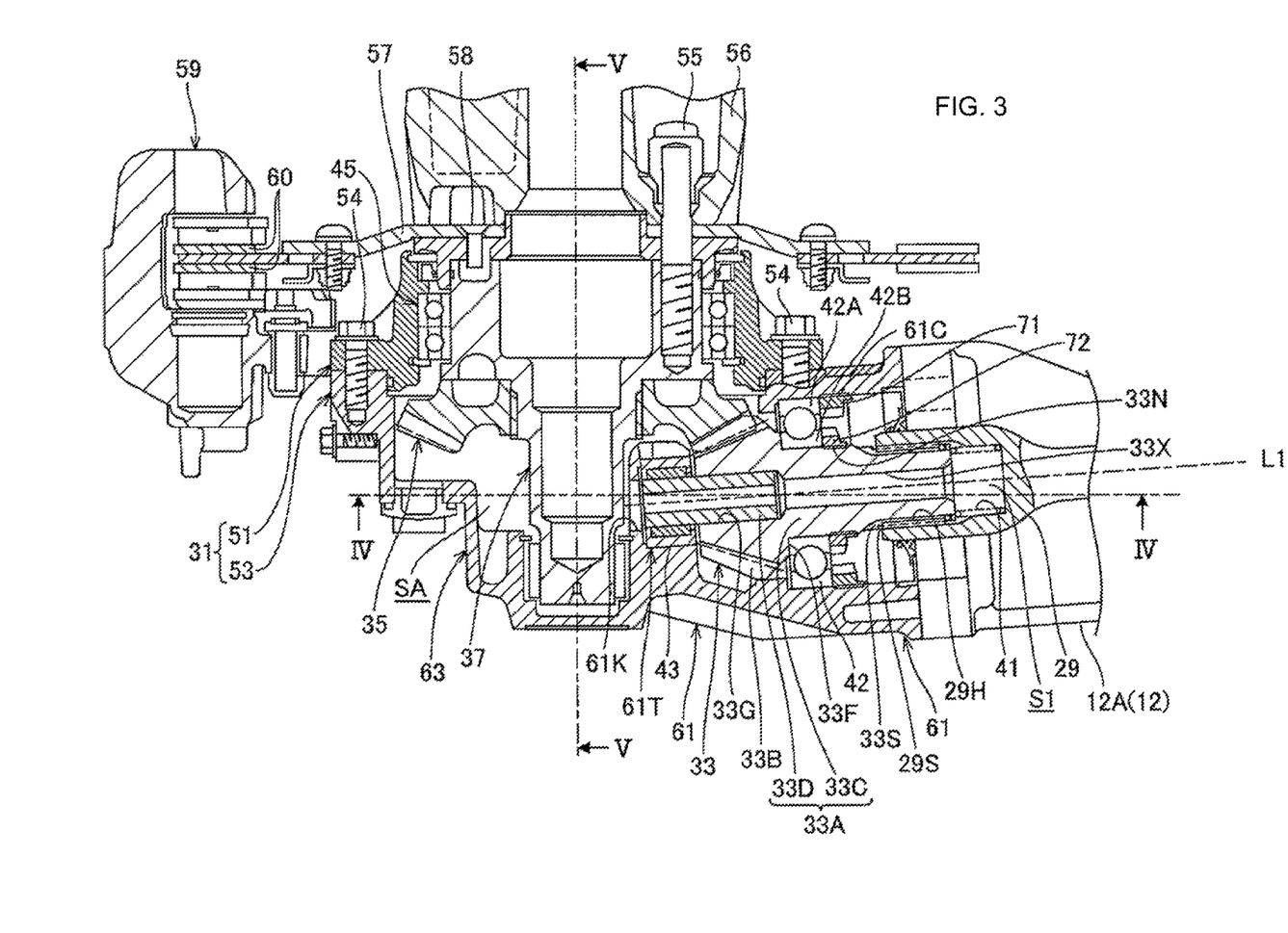
FIG. 3 illustrates in an enlarged form a final gear box shown in FIG. 2, together with the surrounding configuration.
Figure 4:
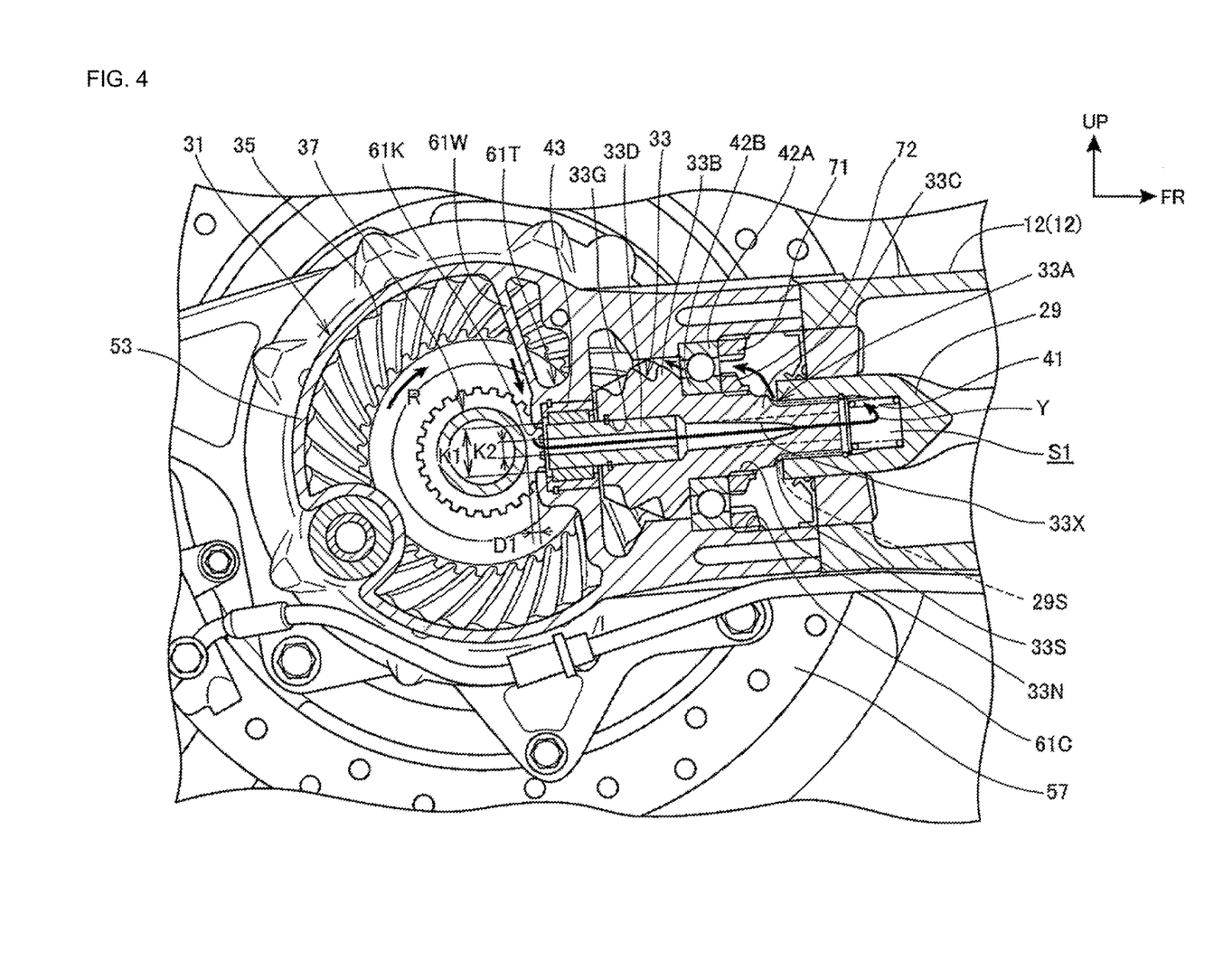
FIG. 4 is a sectional view taken along line IV-IV of FIG. 3.
Figure 5:
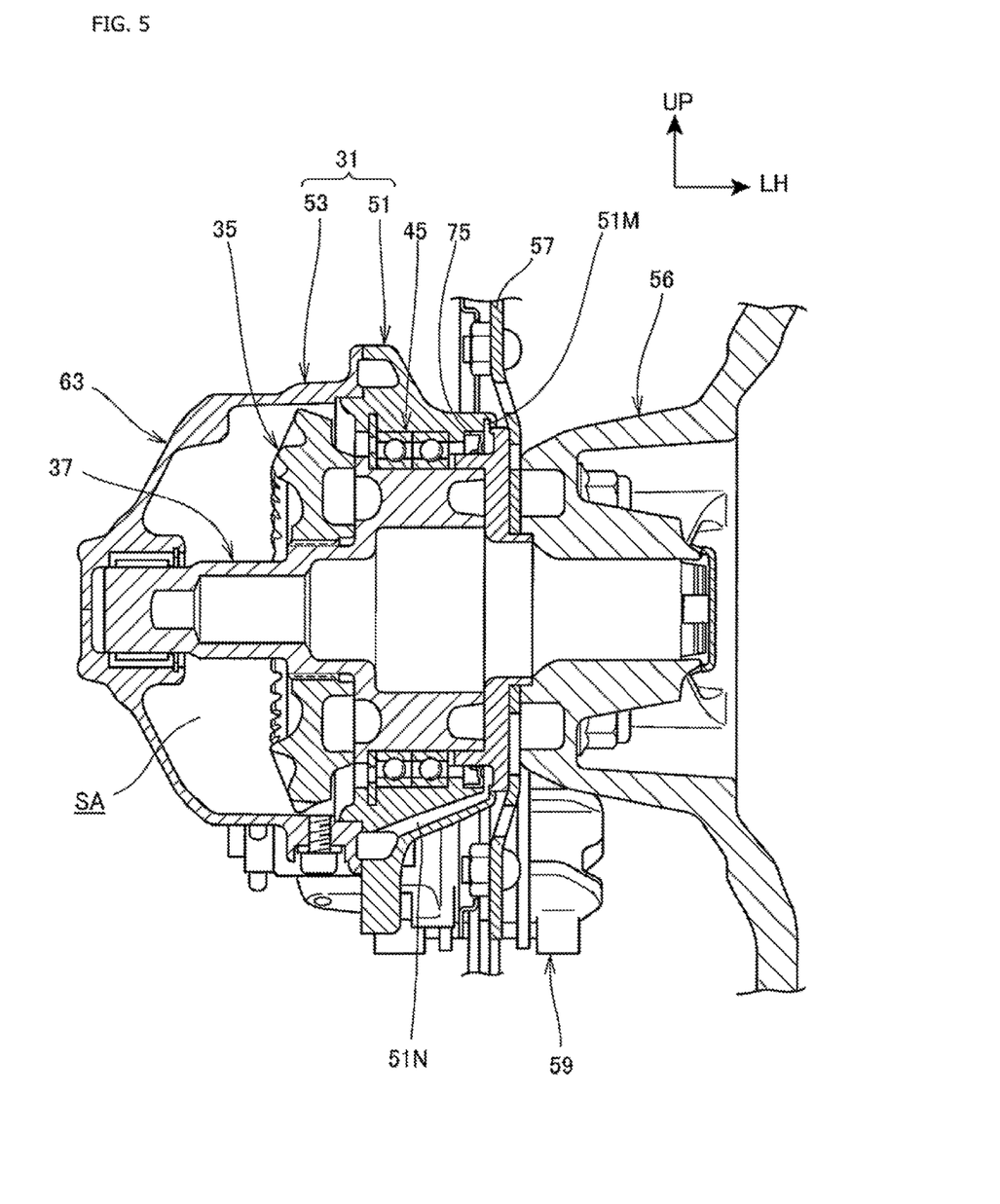
FIG. 5 is a sectional view taken along line V-V of FIG. 3.

FIG. 3 illustrates in an enlarged form the final gear box 31 of FIG. 2 together with the surrounding configuration. FIG. 4 is a sectional view taken along line IV-IV of FIG. 3, and FIG. 5 is a sectional view taken along line V-V of FIG. 3.

As shown in FIGS. 3 and 4, the pinion gear 33 includes a pinion gear shaft portion 33A extending coaxially with an axis L1 of the drive shaft 29, and a gear portion 33B provided in the periphery of the pinion gear shaft portion 33A.

The pinion gear shaft portion 33A includes a shaft portion main body 33C formed integrally with the gear portion 33B and extending from the gear portion 33B to an upstream side (the drive shaft 29 side), and a collar 33D formed as a separate body from the shaft portion main body 33C and extending from the shaft portion main body 33C to a downstream side (the opposite side to the drive shaft 29). Note that in this description, the upstream side means the upstream side in a power transmission course from the engine 11 to the rear wheel 4, and the downstream side means the downstream side in the power transmission course.

The drive shaft 29 is provided, at a rear end constituting the downstream end thereof, with a recess 29H recessed toward the front side (corresponding to the upstream side of the drive shaft 29). A front end constituting an upstream end portion of the pinion gear shaft portion 33A is inserted in the recess 29H.

An inner circumferential wall of the recess 29H is provided with a female spline 29S, whereas an outer circumferential wall of the front end of the pinion gear shaft portion 33A is provided with a male spline 33S for engagement with the female spline 29S. Owing to this structure, the recess 29H and the front end of the pinion gear shaft portion 33A are splined coupled with each other so that the drive shaft 29 and the pinion gear 33 are rotatable as one body and relatively moved in the direction of the axis L1. Note that the axis L1 is the axis of the drive shaft 29, and coincides with the axis of the pinion gear 33.

The female spline 29S and the male spline 33S are formed as spherical splines such that the coupled state of the splines 29S and 33S is maintained even when the drive shaft 29 and the pinion gear 33 are tilted. According to this structure, the coupled state of the drive shaft 29 and the pinion gear 33 can be maintained while permitting the drive shaft 29 and the pinion gear 33 to be tilted.

As shown in FIG. 3, a space portion S1 for securing a gap along the axis L1 is provided between the recess 29H of the drive shaft 29 and the pinion gear shaft portion 33A. The space portion S1 ensures that in the case where the swing arm 12 vertically swings with the pivot shaft 21 as a starting point and a spacing between the pivot shaft 21 and the axle shaft 37 varies, the pinion gear shaft portion 33A moves toward the drive shaft 29 side or moves to a side for retracting from the drive shaft 29, according to the variation of the spacing, whereby a power transmission state can be maintained.

In the space portion S1, a biasing member 41 (in the present example, a coil spring) for biasing the pinion gear 33 toward the bevel gear 35 located on the downstream side in relation to the drive shaft 29 is inserted.

The pinion gear shaft portion 33A is provided with the gear portion 33B in the periphery of a rear end of the shaft portion main body 33C, and a ball bearing 42 (bearing) is mounted to a stepped portion 33F formed between the gear portion 33B and the shaft portion main body 33C. Owing to the ball bearing 42, the pinion gear is supported on the final gear box 31 so as to be rotatable with low friction.

In addition, the shaft portion main body 33C is provided at the rear end thereof with a recess 33G recessed toward the upstream side (the drive shaft 29 side), and the above-mentioned collar 33D is inserted in the recess 33G.

The collar 33D is a cylindrical part to be fitted in the recess 33G, and has a through-hole piercing the collar 33D in the longitudinal direction. The collar 33D protrudes rearward beyond the rear end of the shaft portion main body 33C. The rearwardly protruding rear end of the collar 33D constitutes a downstream-side shaft portion of the pinion gear shaft portion 33A, and is rotatably supported on the final gear box 31 through a needle bearing 43 (bearing).

In this way, the downstream side portion and the upstream side portion, on opposite sides of the gear portion 33B of the pinion gear 33, are rotatably supported with a spacing therebetween. Therefore, such troubles as rotational deviation of the gear portion 33B can be efficiently restrained, and a supporting force relevant to the pinion gear 33 can be secured at a sufficient level.

In addition, since a rear end shaft (downstream-side shaft portion) of the pinion gear shaft portion 33A is composed of the collar 33D provided as a separate body, the gear portion 33B can be subjected to cutting in a condition where the collar 33D is detached and, hence, the rear end shaft is not present. Accordingly, gear cutting can be carried out easily.

The bevel gear 35 is fixed to the axle shaft 37, and meshes with the gear portion 33B of the pinion gear 33. The bevel gear 35 is an annular gear by which a rotational axis is converted by about 90 degrees toward the transverse direction (the axis of the axle shaft 37), whereby the rotation of the pinion gear 33 is converted into a rotational direction of the axle shaft 37. The ratio between the number of teeth of the bevel gear 35 and the number of teeth of the pinion gear 33 constitutes a final speed reduction ratio.

In the present configuration, the drive shaft 29 and the pinion gear 33, which is a gear put in mesh with the bevel gear 35 on the most downstream side, are directly spline coupled with each other. Therefore, as compared with a conventional configuration in which spline coupling is used at a plurality of locations, a simpler structure composed of a reduced number of component parts can be realized, which is advantageous for reduction in weight.

As shown in FIGS. 3 to 5, the final gear box 31 includes a final gear cover 51 which supports the axle shaft 37 in a rotatable manner, and a final gear case 53 attached to one side (right side) of the final gear cover in the transverse direction. The cover 51 and the case 53 are coupled to each other by fastening members 54.

The final gear cover 51 is formed as a cylindrical part surrounding an intermediate portion of the axle shaft 37 in the transverse direction, and supports the axle shaft 37 in a rotatable manner through a ball bearing 45.

A transversely intermediate portion 37A of the axle shaft 37 is formed to be the greatest in diameter of the axle shaft 37. To a surface of the transversely intermediate portion 37A on one side (left side) in the transverse direction, a rear wheel 56 is fastened by fastening members 55. To a surface of the rear wheel 56 on the side opposite to the final gear cover 51, a brake disk 57 is fastened by fastening members 58. This ensures that the brake disk 57 is rotated as one body with the axle shaft 37 and the rear wheel 56.

To a rear portion of the final gear cover 51, a brake caliper 59 is attached. By the brake caliper 59, a brake pad 60 can be pressed against the brake disk 57, whereby the rear wheel 4 can be braked.

Figure 6A:
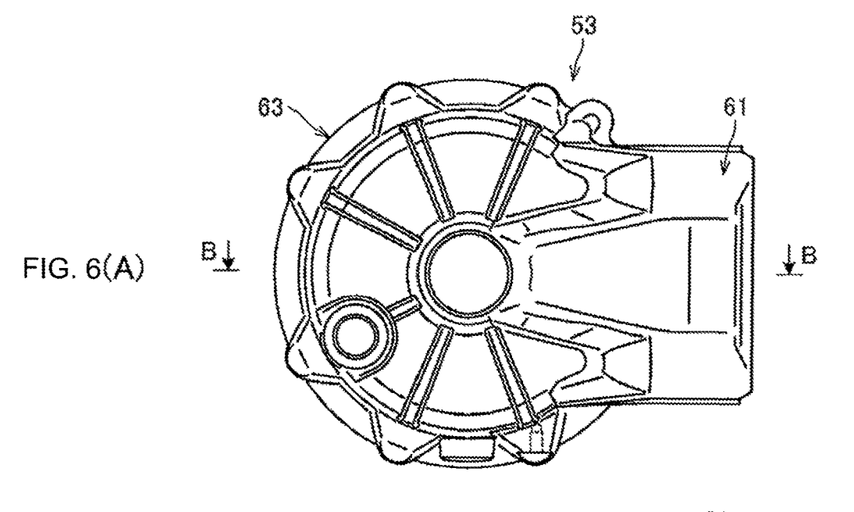
FIG. 6(A) is a view of the final gear case as viewed from outside of a vehicle body.
Figure 6B:
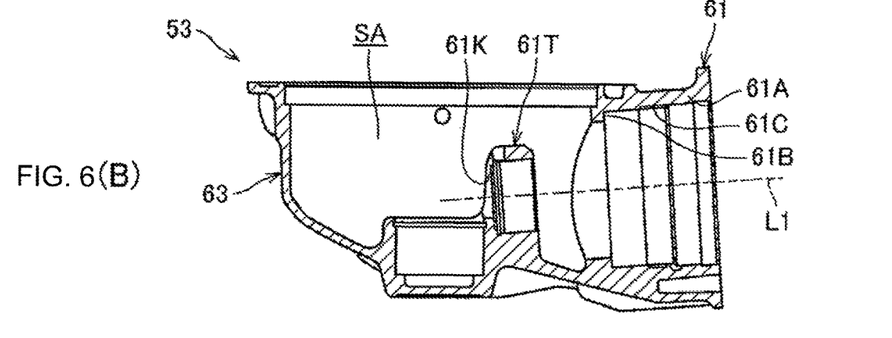
FIG. 6(B) is a sectional view taken along line B-B of FIG. 6(A).
Figure 6C:
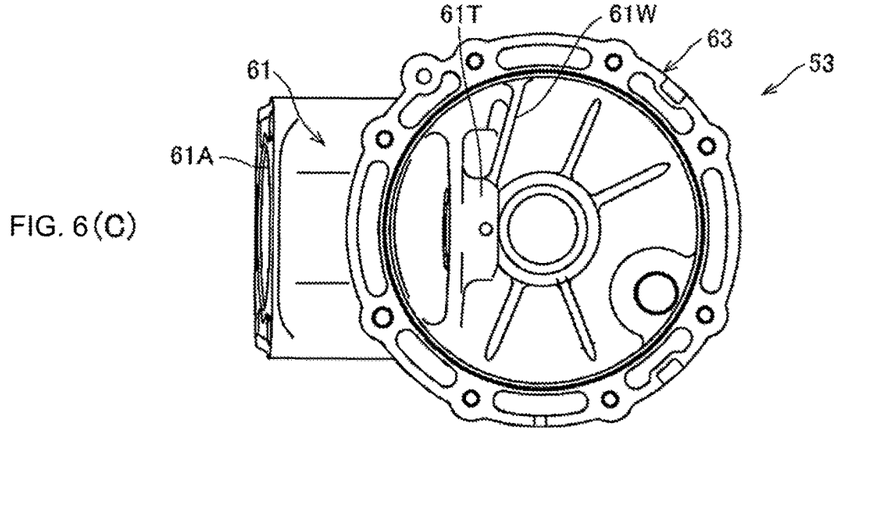
FIG. 6(C) is a view of the final gear case as viewed from inside of the vehicle body.

FIG. 6(A) is a view of the final gear case 53 as viewed from an outer side of the vehicle body (the right side), FIG. 6(B) is a sectional view taken along line B-B of FIG. 6(A), and FIG. 6(C) is a view of the final gear case 53 as viewed from an inner side of the vehicle body (the left side).

The final gear case 53 integrally includes a pinion gear accommodating portion 61 connected to a rear end of the swing arm 12 and accommodating the pinion gear 33, and a bevel gear cover portion 63 connected to the rear of the pinion gear accommodating portion 61 and covering the bevel gear 35.

The pinion gear accommodating portion 61 is formed in a cylindrical shape projecting forward from the bevel gear cover portion 63. The pinion gear accommodating portion 61 is formed at the front thereof with a cylindrical portion 61A into which the ball bearing 42 (FIG. 3) can be inserted from the front side. The depth side of the cylindrical portion 61A is narrowed toward the inner circumference side, so as to form a stepped portion 61B which restrains rearward movement of the ball bearing 42. In addition, the cylindrical portion 61A is formed at the inner circumference thereof with a female screw 61C, with a spacing from the stepped portion 61B which spacing corresponds to the width of the ball bearing 42.

According to this structure, as shown in FIG. 3, when the ball bearing 42 is inserted to a position for making contact with the stepped portion 61B and a lock nut 71 is fastened to the female screw 61C of the cylindrical portion 61A, the lock nut 71 retains the outer race 42A of the ball bearing 42 in the position of being in contact with the stepped portion 61B.

The inner race 42B of the ball bearing 42 is so configured that, by fastening of a lock nut 72 to a male screw 33N provided at the outer circumference of the pinion gear shaft portion 33A, as shown in FIG. 3, the inner race 42B is kept pressed to the side of the gear portion 33B of the pinion gear 33.

As shown in FIG. 6(B), the pinion gear accommodating portion 61 is provided at a rear portion thereof with a recess 61T in which the collar 33D provided as part of the pinion gear shaft portion 33A is disposed. The recess 61T is formed to be greater than the collar 33D in diameter and smaller than the cylindrical portion 61A in diameter, and is opening forward. Into the recess 61T, the needle bearing 43 (FIG. 3) is inserted from the front side. The recess 61T is located proximate to the axle shaft 37 (see FIG. 3), and the pinion gear 33 is disposed by utilizing a space opening on the front side of the axle shaft 37 and on the outer side in the transverse direction (the right side) of the bevel gear 35. Note that a center axis of the cylindrical portion 61A and the recess 61T of the pinion gear accommodating portion 61 coincides with the axis L1 of the drive shaft 29.

The bevel gear cover portion 63 is formed in a bowl-like cover shape for covering the axle shaft 37 and the bevel gear 35 from the right side in the transverse direction. By being fastened and fixed to the final gear cover 51, the bevel gear cover portion 63 defines between itself and the final gear cover 51 an accommodating space portion SA for accommodating the axle shaft 37 and the bevel gear 35.

The accommodating space portion SA functions also as an oil storage portion for storing an oil for lubrication. The oil sticks to the bevel gear 35, to be supplied to a location where the bevel gear 35 and the pinion gear 33 mesh with each other, whereby the meshing location can be lubricated.

In addition, it is also desired for the oil to be supplied also to a location of the splines 29S and 33S through which the drive shaft 29 and the pinion gear 33 are coupled with each other.

In view of this, the pinion gear 33 is provided with a hollow portion 33X piercing the pinion gear 33 in the axial direction. In addition, the recess 61T serving as a support portion for rotatably supporting the pinion gear 33 is provided with an opening 61K permitting the hollow portion 33X to communicate with the accommodating space portion SA. The hollow portion 33X is a hole (inclusive of a hole of the collar 33D) penetrating the pinion gear shaft portion 33A in the axial direction, specifically, a hole piercing the pinion gear 33 along the axis L1.

Owing to this structure, the oil in the accommodating space portion SA can be let flow into the hollow portion 33X through the opening 61K. As the flow of the oil is indicated by arrow Y in FIG. 4, the oil entering the hollow portion 33X flows through the hollow portion 33X into the space portion S1 between the pinion gear 33 and the drive shaft 29. Then, under a centrifugal force due to rotation of the pinion gear 33 and the drive shaft 29, the oil flows toward the outer circumference of the pinion gear 33. Thereafter, the oil flows between the male spline 33S of the pinion gear 33 and the female spline 29S of the drive shaft 29, thereby lubricating the splines 29S and 33S.

In addition, the oil having lubricated the splines 29S and 33S flows around the pinion gear 33, whereby the bearing 42 which bears the pinion gear 33 for rotation can be lubricated. In this way, the splines 29S and 33S through which the pinion gear 33 and the drive shaft 29 are coupled with each other can be lubricated by a simple configuration in which the pinion gear 33 is provided with the hollow portion 33X and the recess 61T (which is a support portion for rotatably supporting the pinion gear 33) is provided with the opening 61K. Note that the oil having lubricated the bearing 42 returns into the accommodating space portion SA through downward falling or the like.

In the present configuration, the final gear case 53 is integrally formed with a wall portion 61W extending upward from the opening 61K of the recess 61T. The wall portion 61W is formed as a wall extending upward on the front side of the axle shaft 37. The wall portion 61W receives the oil raked up by rotation (in FIG. 4, the rotating direction is indicated by arrow R) of the bevel gear 35, so that the oil can be guided to the opening 61K under the effect of gravity. Thus, the wall portion 61W functions as an oil guide wall for guiding the oil in the accommodating space portion SA to the opening 61K.

Moreover, the wall portion 61W is formed as an inclined wall inclined forwardly downward toward the opening 61K, so that the oil can be guided to the opening 61K more efficiently.

Consequently, the oil raked up by the rotation of the bevel gear 35 can be efficiently supplied to the opening 61K by the wall portion 61W.

An inside diameter K1 of the opening 61K is set to be greater than an inside diameter K2 of the hollow portion 33X; in other words, the opening 61K is formed to be greater than the hollow portion 33X in aperture size. As compared to the case where the opening 61K is equal to or smaller than the hollow portion 33X in diameter, therefore, the oil can enter the opening 61K more readily and can enter the hollow portion 33X more easily. Moreover, since a step is formed between the opening 61K and the hollow portion 33X, the step can be let function as an oil accumulation site, and the accumulated oil can enter the hollow portion 33X more easily, as anticipated.

The opening 61K is formed to be proximate to the axle shaft 37 and smaller than the axle shaft 37 in aperture diameter. As a result, a separated distance Dl between the opening 61K and the axle shaft 37 is reduced, and the oil entering this narrow space is let escape to the opening 61K, so that the oil can enter the opening 61K more readily. The separated distance Dl is set to be smaller than the inside diameter K2 of the entrance to the hollow portion 33X (corresponding to the inside diameter of the collar 33D). Consequently, the oil going on and along the final gear case 53 to a location between the recess 61T and the axle shaft 37 can enter into the opening 61K more easily.

According to the aforementioned configuration, during traveling of the motorcycle 10, since the bevel gear 35 is rotated, the oil splashed up by the bevel gear 35 enters into the hollow portion 33X through the opening 61K. The oil in the hollow portion 33X enters into the space portion S1 on the front side under the influence of, for example, an inertial force at the time of deceleration of the motorcycle 10, and lubricates the locations of the splines 29S and 33S under the action of centrifugal forces. The oil having lubricated the location of the splines 29S and 33S flows along the outer circumference of the pinion gear 33 to lubricate the bearing 42 located around the pinion gear 33, and returns into the accommodating space portion SA.

As depicted in FIG. 5, an oil seal 75 is provided between the final gear box 31 and the brake disk 57. The oil seal 75 restrains leakage of the oil having lubricated the ball bearing which bears the axle shaft 37 for rotation. The brake disk 57 side and the radially outer side of the oil seal 75 are covered with the final gear cover 51. In the present example, on the brake disk 57 side of the oil seal 75, an annular drain groove 51M extending along the outer circumference of the axle shaft 37 is provided between the oil seal 75 and the final gear cover 51. With this structure, even if the oil leaks to the outside of the oil seal 75, the leaked oil can be recovered into the drain groove 51M, so that contact of the oil with the brake disk 57 can be obviated.

In a lower portion of the final gear cover 51, there can be provided a lower drain groove 51N extending obliquely downward from a lower portion of the drain groove 51M toward the outer side in the transverse direction. The lower drain groove 51N is formed as a groove through which the oil entering the annular drain groove 51M is discharged to the outer side than the rear wheel 4 in the transverse direction, whereby sticking of the oil to the rear wheel 4 or the like is avoided. Consequently, sticking of the oil to the brake disk 57 or the rear wheel 4 can be obviated more reliably.

As has been described above, in certain embodiments, the final gear box 31 is provided in which the pinion gear 33 and the bevel gear 35 are accommodated and the oil for lubrication is contained. The drive shaft 29 is provided at the downstream end thereof with the recess 29H in which the upstream end of the pinion gear shaft portion 33A constituting the shaft portion of the pinion gear 33 is disposed. The recess 29H and the upstream end of the pinion gear shaft portion 33A are spline coupled to each other so that the drive shaft 29 and the pinion gear 33 can be rotated as one body and relatively moved in the axial direction. The space portion S1 permitting axial movement between the drive shaft 29 and the pinion gear 33 is provided between the pinion gear 33 and the recess 29H. The pinion gear 33 is provided with the hollow portion 33X which pierces the pinion gear 33 in the axial direction and guides the oil to the hollow portion S1. According to this configuration, since the drive shaft 29 and the pinion gear 33, which is a gear meshing with the bevel gear 35 on the most downstream side, are directly spline coupled with each other. As compared to a conventional configuration in which spline coupling is used at a plurality of locations, therefore, a simpler structure having a reduced number of component parts can be realized, which is advantageous for reduction in weight.

Moreover, since the oil is guided into the space portion S1 permitting axial movement between the drive shaft 29 and the pinion gear 33, the oil can be supplied to and lubricate the location of the splines 29S and 33S through which the drive shaft 29 and the pinion gear 33 are coupled to each other.

Accordingly, favorable lubrication of the location of the spline coupling can be achieved while realizing a configuration advantageous for reduction in weight of the transmission structure between the drive shaft 29 and the gear (pinion gear 33) meshing with the bevel gear 35 located on the most downstream side.

The female spline 29S of the drive shaft 29 and the male spline 33S of the pinion gear 33 can be formed as spherical splines such as to couple the drive shaft 29 and the pinion gear 33 to each other while permitting tilting of them. For this reason, the drive shaft 29 and the pinion gear 33 can be appropriately coupled to each other with a simple configuration.

The final gear box 31 includes the opening 61K communicating with the hollow portion 33X, and the wall portion 61W which extends upward from the opening 61K and functions as an oil guide wall for receiving the oil raked up by rotation of the bevel gear 35. As a result, the oil can be guided into the opening 61K more easily and can enter the hollow portion 33X more readily.

In addition, the opening 61K is so formed as to communicate with one end of the hollow portion 33X and to be greater than the hollow portion 33X in aperture size. Therefore, a step is formed between the opening 61K and the hollow portion 33X, and, with the step functioning as an oil sump, the oil can flow into the hollow portion 33X more readily.

The pinion gear 33 has the rear end as the downstream end rotatably supported on the final gear box 31, on the side opposite to the front end serving as the upstream end. The rear end is composed of the collar 33D inserted in the recess 33G provided in the pinion gear shaft portion 33A. Therefore, while using a configuration in which the downstream end of the pinion gear 33 is supported rotatably, the gear cutting for the pinion gear 33 can be performed easily by detaching the collar 33D at the time of gear cutting, whereby manufacturing cost can be reduced easily.

The separated distance Dl between the axle shaft 37 constituting the shaft portion of the bevel gear and the opening 61K of the final gear box 31 is smaller than the inside diameter K2 of the hollow portion 33X of the pinion gear 33. Therefore, the oil having flowed on and along the final gear box 31 to a location between the opening 61K and the axle shaft 37 can enter the opening 61K easily.

Of the ball bearing 42 which is the bearing for supporting the pinion gear 33 for rotation, the inner race 42B is fixed by the lock nut 72 fastened to the pinion gear shaft portion 33A, whereas the outer race 42A is fixed by the lock nut 71 fastened to the final gear box 31. Therefore, the ball bearing 42 can be fixed easily.

The brake disk 57 is provided on the inner side of the final gear box 31 in the transverse direction, the oil seal 75 is provided between the final gear box 31 and the brake disk 57, and the annular drain groove 51M is provided on the outer side of the oil seal 75 so as to extend along the outer circumference of the axle shaft 37. Therefore, the oil coming to the outside of the oil seal 75 can be recovered into the drain groove 51M, whereby sticking of the oil to the brake disk 57 or the like can be avoided.

The aforementioned embodiments are merely exemplary embodiments of the present invention, and arbitrary modifications and applications are possible within the spirit and scope of the invention.

For instance, while the case of applying the present invention to the motorcycle 10 shown in FIG. 1 has been described in the above embodiment, this is not restrictive, and the invention is widely applicable to shaft drive type vehicles. Besides, the shaft drive type vehicle is not limited to a motorcycle but may be a three-wheeled or four-wheeled vehicle such as ATV (all terrain vehicle). In addition, the power source of the shaft drive type vehicle is not limited to the engine 11 but may be a motor.

DESCRIPTION OF REFERENCE SYMBOLS

10 Motorcycle (shaft drive type vehicle)
29 Drive shaft
29H Recess
29S Female spline
31 Final gear box
33 Pinion gear
33A Pinion gear shaft portion
33G, 61T Recess
33S Male spline
33X Hollow portion
35 Bevel gear
37 Axle shaft (shaft portion of bevel gear 35)
42 Ball bearing (bearing)
42A Outer race
42B Inner race
51M Drain groove
51N Lower drain groove
57 Brake disk
61K Opening
61W Wall portion (oil guide wall)
71, 72 Lock nut
75 Oil seal
S1 Space portion
SA Accommodating space portion

The invention claimed is:

1. A shaft drive type vehicle, comprising:
a power source configured to transmit power through a drive shaft to a pinion gear, and to an axle shaft through a bevel gear meshing with the pinion gear;
a final gear box configured to accommodate the pinion gear and the bevel gear in a rotatable manner, and to contain an oil for lubrication,
wherein a recess in which to dispose an upstream end of a pinion gear shaft portion constituting a shaft portion of the pinion gear is disposed at a downstream end of the drive shaft,
wherein the recess and the upstream end of the pinion gear shaft portion are spline coupled to each other so that the drive shaft and the pinion gear are configured to be rotated as one body and relatively moved in an axial direction, and
wherein a space portion permitting relative movement between the drive shaft and the pinion gear in the axial direction is disposed between the pinion gear and the recess, with the pinion gear including a hollow portion which pierces the pinion gear in the axial direction and conducts the oil to the space portion.

2. The shaft drive type vehicle according to claim 1,
wherein the recess includes a female spline,
wherein the pinion gear includes a male spline configured to engage with the female spline, and
wherein the female spline and the male spline comprise spherical splines which are coupled with each other and are configured to permit the drive shaft and the pinion gear to be tilted.

3. The shaft drive type vehicle according to claim 1,
wherein the final gear box includes an opening communicating with the hollow portion, and an oil guide wall extending upward from the opening, the oil guide wall configured to receive the oil raked up by rotation of the bevel gear.

4. The shaft drive type vehicle according to claim 3,
wherein the opening communicates with one end of the hollow portion and is larger than the hollow portion in aperture size.

5. The shaft drive type vehicle according to claim 3,
wherein the pinion gear includes a downstream end rotatably supported on the final gear box, on a side opposite to the upstream end of the pinion gear shaft portion, and the downstream end comprises a collar inserted in a recess disposed in the pinion gear shaft portion.

6. The shaft drive type vehicle according to claim 3,
wherein a separated distance between a shaft portion of the bevel gear and the opening of the final gear box is smaller than an inside diameter of the hollow portion of the pinion gear.

7. The shaft drive type vehicle according to claim 1,
wherein the pinion gear is rotatably supported on the final gear box through a bearing including an inner race and an outer race,
wherein the inner race is fixed by a first lock nut fastened to the pinion gear shaft portion, and
wherein the outer race is fixed by a second lock nut fastened to the final gear box.

8. The shaft drive type vehicle according to claim 1, further comprising:
a brake disk disposed on an inner side of the final gear box in a transverse direction;
an oil seal disposed between the final gear box and the brake disk; and
an annular drain groove disposed on an outer side of the oil seal and extending along an outer circumference of the axle shaft.

9. A shaft drive type vehicle, comprising:
power source means for transmitting power through a drive shaft to a pinion gear, and to an axle shaft through a bevel gear meshing with the pinion gear;
final gear box means for accommodating the pinion gear and the bevel gear in a rotatable manner, and for containing oil for lubrication;
recess means for receiving an upstream end of a pinion gear shaft portion constituting a shaft portion of the pinion gear, said recess means being disposed at a downstream end of the drive shaft, wherein the recess means and the upstream end of the pinion gear shaft portion are spline coupled to each other such that the drive shaft and the pinion gear are rotatable as one body and relatively moved in an axial direction;
space portion means for permitting relative movement between the drive shaft and the pinion gear in the axial direction, said space portion means being disposed between the pinion gear and the recess means, with the pinion gear including a hollow portion which pierces the pinion gear in the axial direction and conducts the oil to the space portion means.

10. The shaft drive type vehicle according to claim 9, wherein the recess means includes a female spline, wherein the pinion gear includes a male spline for engaging the female spline, and wherein the female spline and the male spline comprise spherical splines which are coupled to each other for permitting the drive shaft and the pinion gear to be tilted.

11. The shaft drive type vehicle according to claim 9, wherein the final gear box means includes an opening communicating with the hollow portion, and oil guide wall means extending upward from the opening for receiving the oil raked up by rotation of the bevel gear.

12. The shaft drive type vehicle according to claim 11, wherein the opening is for communication with one end of the hollow portion, and is larger than the hollow portion in aperture size.

13. The shaft drive type vehicle according to claim 11, wherein the pinion gear includes a downstream end rotatably supported on the final gear box means, on a side opposite to the upstream end of the pinion gear shaft portion, and wherein the downstream end comprises a collar inserted in a recess disposed in the pinion gear shaft portion.

14. The shaft drive type vehicle according to claim 11, wherein a separated distance between a shaft portion of the bevel gear and the opening of the final gear box means is smaller than an inside diameter of the hollow portion of the pinion gear.

15. The shaft drive type vehicle according to claim 9, wherein the pinion gear is rotatably supported on the final gear box means through a bearing, said bearing including an inner race and an outer race, wherein the inner race is fixed by first locking means fastened to the pinion gear shaft portion, and wherein the outer race is fixed by a second locking means fastened to the final gear box means.

16. The shaft drive type vehicle according to claim 9, further comprising:
brake disk means for braking, said brake disk means being disposed on an inner side of the final gear box means in a transverse direction;
oil seal means for providing an oil seal, said oil seal means being disposed between the final gear box means and the brake disk means; and
drain means for draining oil, said drain means being disposed on an outer side of the oil seal and extending along an outer circumference of the axial shaft.

17. The shaft drive type vehicle according to claim 16, wherein the drain means comprises an annular drain groove.

* * * * *